United States Patent [19]

Bradford et al.

[11] E Patent Number: Re. 33,087

[45] Reissued Date of Patent: Oct. 10, 1989

[54] ELECTRIC POWER DISTRIBUTION AND LOAD TRANSFER SYSTEM

[75] Inventors: Michael P. Bradford, Orange; Gerald W. Parkinson; Ross M. Grant, both of Shelton, all of Conn.

[73] Assignee: United Technologies Corporation, Hartford, Conn.

[21] Appl. No.: 146,057

[22] Filed: Jan. 20, 1988

Related U.S. Patent Documents

Reissue of:

[64] Patent No.: 4,638,175
Issued: Jan. 20, 1987
Appl. No.: 627,706
Filed: Jul. 3, 1984

[51] Int. Cl.[4] ..... H02J 7/00

[52] U.S. Cl. ..... 307/64; 307/65; 307/66; 307/80; 361/64; 361/65; 361/66; 361/80; 361/90; 361/91; 361/92

[58] Field of Search ..... 361/86, 87, 88, 90, 361/91, 92, 93, 100, 101; 307/18, 23, 29, 28, 44, 48, 52, 60, 64, 65, 66, 70, 80, 81, 85, 86; 340/660, 661, 662, 663, 664

[56] References Cited

U.S. PATENT DOCUMENTS

| | | | |
|---|---|---|---|
| 3,555,290 | 1/1971 | Ellermeyer | 307/65 |
| 3,657,603 | 4/1972 | Adams | 361/90 X |
| 3,696,286 | 10/1972 | Ule | 307/66 X |
| 3,753,001 | 8/1973 | Hiroshima et al. | 307/64 X |
| 4,017,779 | 4/1977 | McDonald et al. | 307/48 X |
| 4,096,394 | 6/1978 | Ullmann et al. | 307/48 X |
| 4,210,906 | 7/1980 | Smith et al. | 361/91 X |
| 4,262,214 | 4/1981 | Patel | 361/92 X |
| 4,356,402 | 10/1982 | Morimoto et al. | 307/23 X |
| 4,492,876 | 1/1985 | Colbert et al. | 307/66 X |
| 4,496,168 | 1/1985 | D'Antonio et al. | 307/66 X |
| 4,528,458 | 7/1985 | Nelson et al. | 307/44 X |
| 4,564,767 | 1/1986 | Charych | 307/66 |
| 4,594,634 | 6/1986 | Schminke | 361/100 X |
| 4,617,473 | 10/1986 | Bingham | 307/66 |
| 4,618,779 | 10/1986 | Wiscombe | 307/60 |
| 4,623,967 | 11/1986 | Naimer | 361/93 X |
| 4,638,175 | 1/1987 | Bradford et al. | 361/90 X |
| 4,696,578 | 10/1987 | Mullersman et al. | 307/66 X |

*Primary Examiner*—Derek S. Jennings
*Attorney, Agent, or Firm*—Peter R. Ruzek

[57] ABSTRACT

A power distribution system includes a plurality of power sources and load transfer units including transistors and diodes connected in series and leading to a common power output, each of the transistors being controller switchable subject to voltage levels of the respective input and output sides of said transistors, and the voltage and current level of said common power output. The system is part of an interconnection scheme in which all but one of the power sources is connected to a single load transfer unit, enabling the survival of at least a single power source with the failure of one of the load transfer units.

20 Claims, 4 Drawing Sheets

ELECTRIC POWER DISTRIBUTION AND LOAD TRANSFER SYSTEM

Matter enclosed in heavy brackets [ ] appears in the original patent but forms no part of this reissue specification; matter printed in italics indicates the additions made by reissue.

The Government has rights in this patent under Contract No. NAS2-11058 awarded by NASA.

DESCRIPTION

TECHNICAL FIELD

The invention herein relates to electric power distribution and load transfer systems, and more particularly to those that utilize solid-state switching circuitry to provide essentially uninterruptible power to a flight control computer system.

BACKGROUND ART

Presently known systems for providing uninterruptible power to flight control computer systems include power supply systems having capacitor banks to store energy and to supply power to the flight control computer system during primary power interruptions.

Additionally, flight control computers have in the past utilized diode-isolated multiple power supplies. In at least one of such diode-isolated power supplies, [nickle] *nickel* cadmium batteries were employed for energy storage.

In addition, power supplies employing multicoil transformers for maintaining DC power upon loss of one or more of the AC primary sources, are also well known.

However, each of these systems is hampered by substantial disadvantages. For example, capacitor banks for power storage typically need to be very large in order to provide a reasonably adequate power storage time. Moreover, the storage capacity of the capacitor banks deteriorates with the failure of individual capacitors of the bank. Such failures are difficult to detect. Moreover, the capacitors are flammable and can be dangerous.

In the case of diode-isolated multiple source power supplies, a ground fault at the flight control computer would simultaneously affect each of the system power sources. Also, a single over-voltage transient can pass through the diode source connection and detrimentally affect all computers tied to that bus. Additionally, no capability exists in such a system to establish power source priorities.

Diode-isolated dual-source supplies featuring batteries have all the disadvantages of diode isolated multiple prime-source supplies, and others in addition. For example, such sources are subject to the added difficulty of needing to measure the charge state of the [nickle] *nickel* cadmium batteries employed. Beyond this, the [nickle] *nickel* cadmium battery packs are heavy and require considerable maintenance. Finally, multicoil transformer supplies offer no over-voltage protection; and, a short circuit in any one of the coils can cause a complete loss of power affecting the entire computer system.

An object of the invention is to provide an electric power distribution and load transfer system, which applies any of a plurality of separate power sources, each of the units being isolated with respect to each other.

According to the invention, an electric power distribution and load transfer system is provided for insuring that at least one of several power sources connected to corresponding lead transfer units is fault free in the case of a single one of said load transfer units failing.

DISCLOSURE OF INVENTION

According to the invention, electrical power is supplied (e.g. to a flight computer) through a load transfer unit. The load transfer unit in turn is supplied by several, for example four out of a possible five independent power sources, each of which is independently capable of fully powering the computer alone.

According to the invention, an electric power distribution and load transfer system is provided for insuring that at least one of several power sources connected to corresponding load transfer units is fault free in the case of a single one of said load transfer units failing.

Each load transfer unit monitors each of the four power sources as well as the power output to the flight control computer. Upon detecting an abnormal voltage condition, it automatically switches the computer to another one of the available power sources.

According to the invention, all but one of several power sources are connected to each of several load transfer units, permitting the survival of at least one power source (the disconnected one) in the event that one of said load transfer units is destroyed, possibly rendering inoperable all of the power sources connected to the destroyed load transfer unit.

BEST MODE FOR CARRYING OUT THE INVENTION

Figure 1:
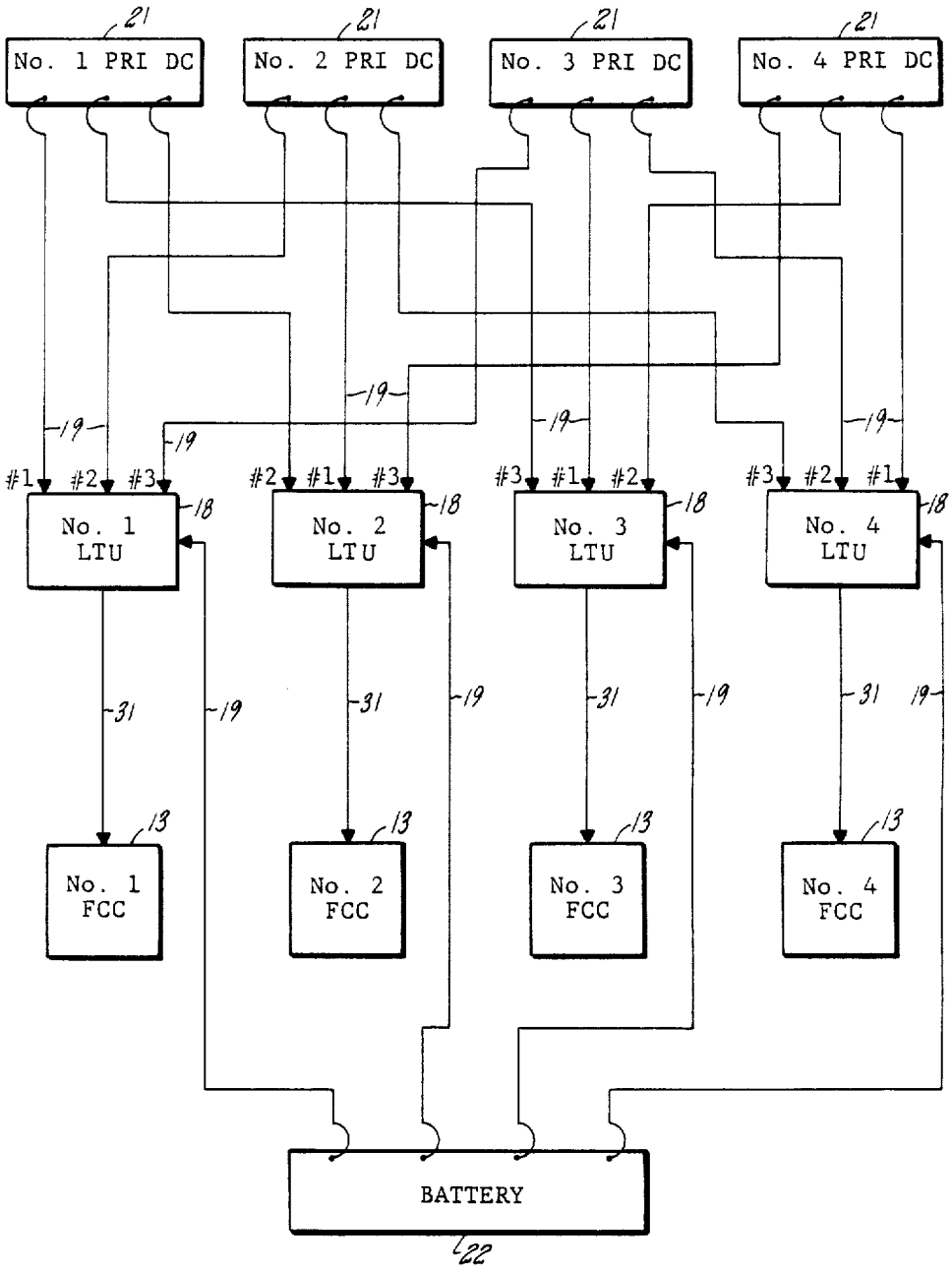
FIG. 1 is a schematic of the power distribution system generally.

Referring to FIG. 1, a complete power distribution system may supply four devices, e.g. independent flight control computers 13 through corresponding load transfer units 18. According to the invention, this arrangement is effective for increasing the level of certainty that at least one fault-free source is available in the event that a particular load transfer unit 18 should fail. This can happen for example by a short circuit at any of electric power leads or inputs 19 from a primary or alternate DC power source 21 or from a battery source 22 leading to the load transfer units 18. Such a combination of power and battery sources is typical of contemporary aircraft systems.

The input leads 19 from the respective power sources 21 and battery source 22, are staggered as shown in FIG. 1 to enable continued operation of all but one of flight control computers 13, if a single one of the load transfer units 18 is destroyed, as in battle for example, and all of the four input leads 19 to that load transfer unit are simultaneously shorted out.

The power inputs 19 are effective for connecting the power sources 21 with the load transfer units according to an interconnection scheme in which each of the power sources is connected to all but one of the load transfer units, the omitted one of the load transfer units 18 being different for each of the power sources. As a consequence of this arrangement, the inadvertent grounding of all of the inputs or leads 19 to any one of the load transfer units 18 can have no impact upon the single one of the power sources 21 not connected to the affected load transfer unit 18.

Figure 2:
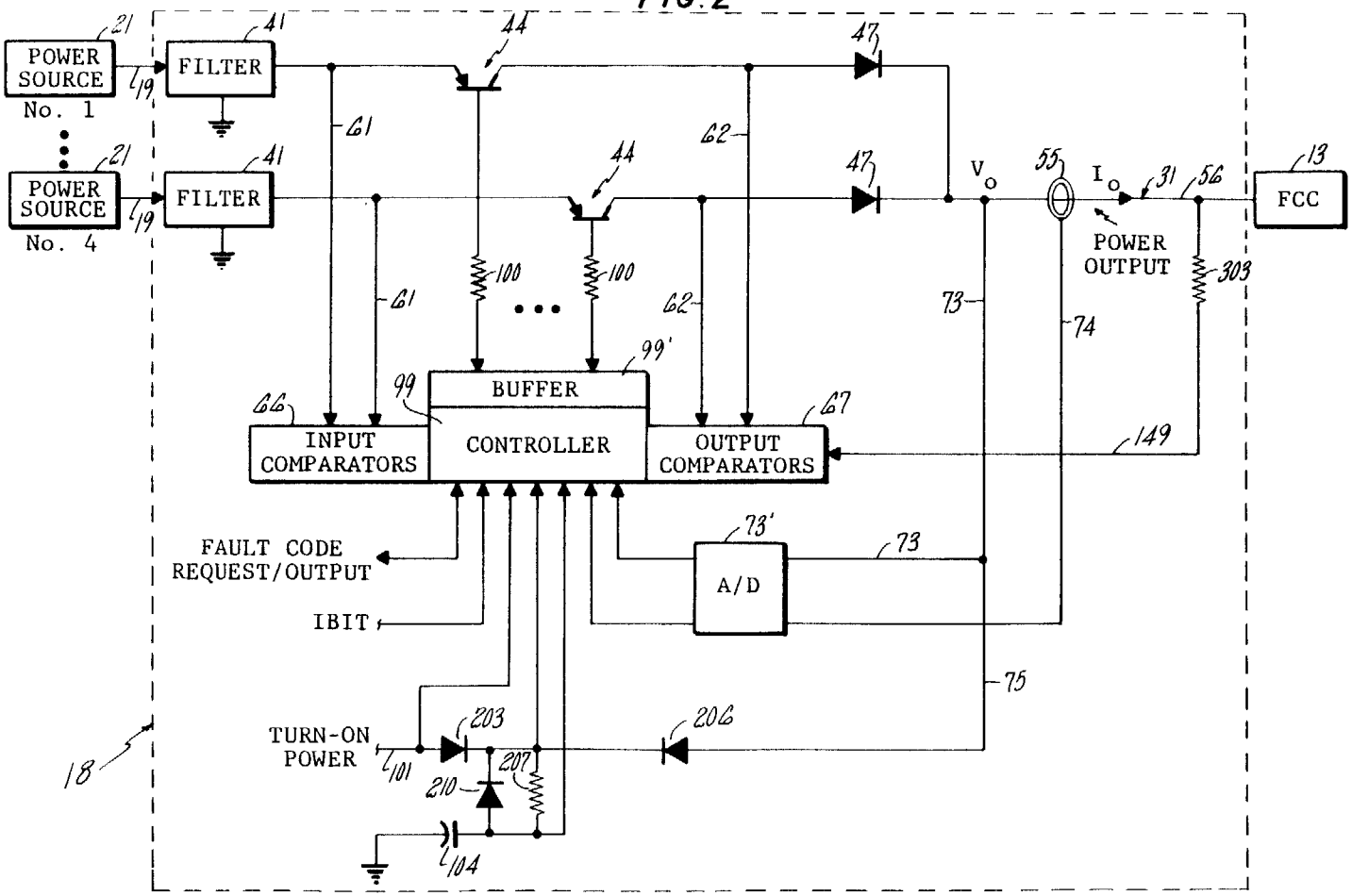
FIG. 2 is a schematic diagram of a load transfer unit according to the invention herein.

Each load transfer unit 18 as shown in FIG. 2 includes a four-channel, preferably solid-state switching circuit supplying power to a corresponding one of the flight control computers 13. Such load transfer units 18 provide the fast switching speeds necessary to keep the flight control computers 13 operational and adequately powered. Further, the use of the solid-state components as indicated hereinafter establishes substantially more reliable load transfer units 18 than is possible with electromechanical components.

Each load transfer unit 18, according to a preferred embodiment of the invention, has four of a possible five power inputs 19, each acting independently to provide a sufficient level of power for effective operation of a given flight control computer.

The load transfer unit 18 selects which of the inputs 19 is to power a corresponding flight control computer 13, according to a predetermined priority system. For example, the power sources 21 and battery source 22 can sequentially be assigned priorities as indicated in FIG. 1 by the numbers adjacent the input power leads 19 outside of the LTUs 18.

As shown in FIG. 2, each of the inputs 19 is subject to detection along one of voltage detection leads 61 for abnormal voltage conditions including insufficient or excessive voltage levels. Upon detection of an abnormal voltage condition, the load transfer unit 18 automatically switches to a lower level of priority input 19. Should the original higher priority input 19 subsequently become available at a normal acceptable level of voltage, the load transfer unit 18 automatically switches back to that input 19 after a short time delay.

Each load transfer unit 18 additionally has a single power output 31, which is monitored for an overstress condition as shown in FIG. 2. This overstress can manifest itself in either an excessive output voltage or current. Upon sensing a current overload without a concurrent voltage rise, provided the current overload is of sufficient duration such as for example over five (5) milliseconds, the load transfer unit 18 latches into an off-state under controller 99 direction until all power is removed from the unit. The load transfer unit 18 then resets, enabling power operation to be reinitiated at a later point. In the event of a voltage overstress, the load transfer unit 18 merely switches to a lower priority level input power lead 19.

The switching time of the load transfer unit 18 is one-half of the hold-up time of a flight control computer 13 after loss of power, the total hold-up time being 600 microseconds for a particular known application. The computer hold-up time is defined as the time interval between power interruption and performance degradation of the computer.

Each power or battery source, 21 or 22, is suitably electrically connected to its corresponding load transfer unit 18 through a suitable low-pass power filter 41 effective for suppressing voltage spikes and high frequency oscillations occurring during operation in intense electromagnetic interference, electromagnetic pulse or lightning environments. A suitable filter according to the invention herein is an Erie 1202-056 pi-type filter effective for establishing an attenuation of eight (8) decibel at ten (10) megahertz.

Power is routed in each case through a power transistor 44 and power diode 47 arranged in series, thereby establishing required redundancy and isolation in the event of component failure, while concurrently presenting a simple configuration of components and a low level of internal power dissipation. In one embodiment of the invention, a 120 volt, 50 ampere pnp power transistor JANTX2N6379 can be employed. The corresponding power diode can for example be a 600 volt, 35 ampere JANTXIN1190 diode. The diodes 47 are commonly connected before the corresponding one of power outputs 31, leading power through current sensor 55, such as for example a Hall effect current sensor. Information regarding the output voltage and current of the LTU 18 is analog in form, and is converted to digital form at analog to digital unit 73' for input to controller 99. A single conductor 56 then carries the output power to the associated flight control computer 13.

Figure 3:
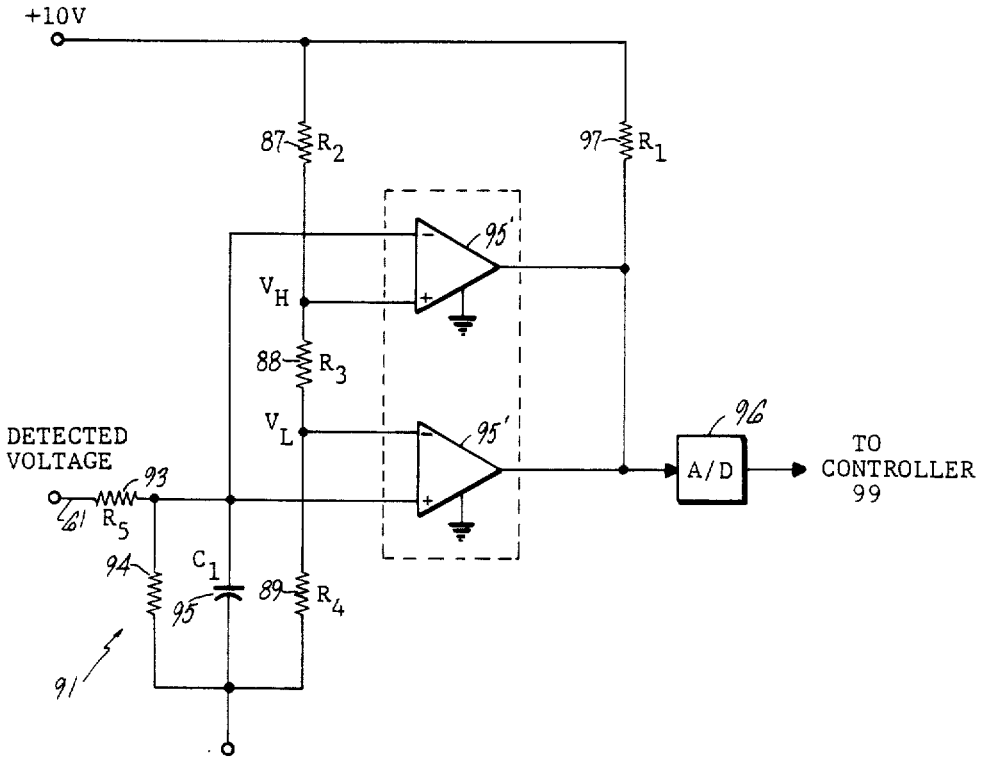
FIG. 3 is a schematic of the window comparators employed with the power distribution system.

An input comparator 66 which is preferably a window comparator as shown in greater detail in FIG. 3, detects the input voltage levels at the respective power inputs 19 through detection leads 61. Details of the window comparator 66 and associated circuitry are shown in FIG. 3.

Similar detection leads 62 provide output comparators 67 with indications of the voltage levels on the output side of transistors 44. The output comparators 67 detect abnormal over- and under-voltage conditions regarding the voltage levels on the outputs of transistors 44.

This arrangement is effective for monitoring the continued operation of all power sources 21 and 22 within MIL-STD-704 voltage limits. Further, this provides information regarding whether all of the transistors 44 are in proper conductive or non-conductive states, and whether each diode 47 is suitably reverse biased.

Comparators 66 and 67 and the discrete logic elements shown in FIG. 3 are used to lighten the computational load of controller 99, such as a microprocessor, for example one manufactured by Intel under model number 8022, thereby increasing cycle speed. The controller 99 is effective for switching transistors 44 on and off by signals sent through a suitable buffer 99' and current limiting resistors 100.

The circuit in FIG. 3 shows the arrangement of a window comparator for detecting a single one of input voltages along one of detection lines 61. High and low voltage thresholds, respectively $V_H$ and $V_L$, are set by selecting appropriate resistances for series resistors 87, 88 and 89. The high side of resistor 87 is for example set at positive 10 volts DC, thereby establishing the high voltage threshold $V_H$ and the low voltage threshold $V_L$ at respectively diminishing fractions of ten volts. Respective comparators 95' are connected as shown in FIG. 3.

FIG. 3 further shows a filter circuit 91 including resistors 93 and 94 and capacitor 95 in parallel with resistor 94, effective for providing a delay to slow circuit response to approximately 50 microseconds from a natural speed of approximately two (2) microseconds. Resistor 93 additionally scales down the detected voltage to an appropriate comparison level.

Thus, if the detected voltage provided along lead 61 is within limits and scaled down by resistor 93, for input to comparators 95' on a single LM139A chip for example (one-hald thereof is shown), and the high and low voltages are applied to the remaining respective inputs of the comparators 95', the output voltage from the comparator is high.

This level is accordingly applied to the input of analog-to-digital converter 96, and transferred in modified form to controller 99 for interpretation.

The voltage and current levels at power output 31 are proportionately sensed for exact indication levels, along respective voltage and current detection leads 73 and 74, because the initial turn-on voltage is feedback controlled in a ramp format and thus increases gradually, requiring monitoring during the entire evolution.

Accordingly, faults and power-source over-voltages with respect to any of flight control computers 13 can be anticipated by calculating the rate of output voltage and current change.

All load transfer unit circuits are initially powered-up by an internal or external turn-on voltage at input 101, which is subsequently removed. Lead 101 is connected to the anode of a power diode 203. After turn-on, the load transfer unit 18 is powered from the power output 31 along leads 73 and 75 through another power diode 206 as shown in FIG. 2. A capacitor 104 or several capacitors in parallel effectively store sufficient charge from lead 101 or power output 31 through power diode 206 and resistor 207, to maintain upon discharge through power diode 210 all functions of the load transfer unit 18 and controller 99, despite possible interrupts and reconfigurations. The combination of resistor 207 and diode 210 protects capacitor 104 from too fast a rate of charging, while nonetheless permitting unrestricted discharge to power the controller 99 and the load transfer unit 18.

Should power to the load transfer unit 18 be lost for a period beyond the discharge capacity of the capacitor 104, the unit 18 shuts down until it receives another turn-on pulse through input 101.

A wraparound signal lead 149 through current limiting resistor 303, for example at 10K ohm, is effective for detecting the voltage level actually supplied to the computer 13.

Power transistor 44 effectively blocks voltage surges from reaching the flight control computer 13. Moreover, the input voltage detection leads 61 are effective for timely detection of over-voltages, causing controller 99 to disable the affected channel before any damage is sustained. Should an over-voltage develop in a powered channel, the load transfer unit 18 deenergizes the transistor 44 and switches away therefrom.

Figure 4:
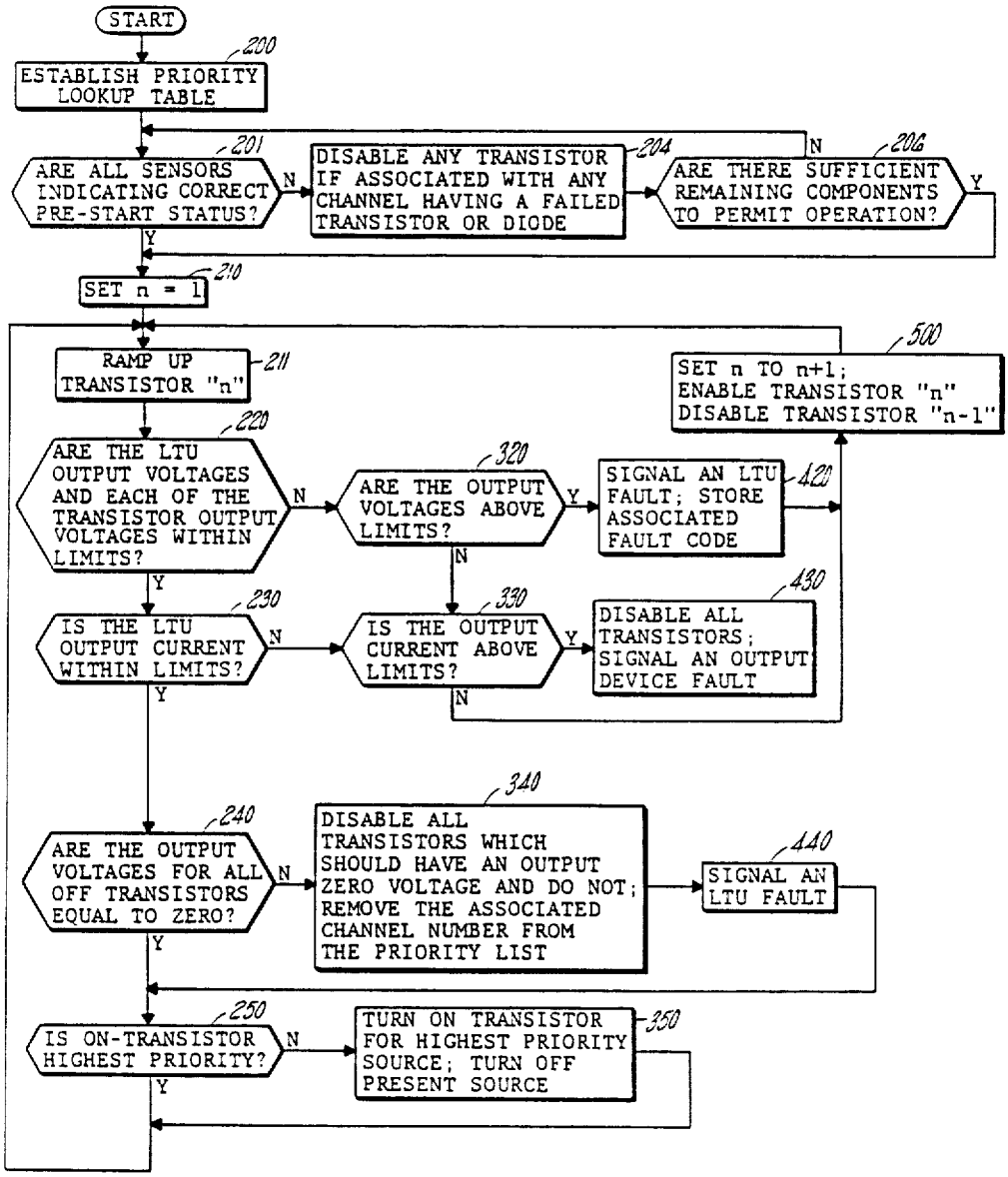
FIG. 4 is a flowchart indicating a preferred sequence of operation.

FIG. 4 is a flowchart indicating controller 99 operation according to a preferred scheme of operation. Once operation is started, as by ramping up a turn-on power level on line 101 (see FIG. 2), a lookup table is established defining power source and channel priorities (see block 200) and all sensors are checked for correct start-up status, as indicated at decision block 201.

If any of the input or output voltages with regard to any of transistors 44 are out of bounds or not in correct on or off status, indicating a failed transistor or diode, the associated power channel is turned off by disabling the corresponding transistor 44, as suggested at block 204 of the flowchart.

Decision block 206 then decides whether there are sufficient remaining operable components to permit effective operation. If so, operation continues, as discussed below.

Initially, channel "1" is ramped up through its corresponding transistor, since that is the selected channel of highest priority, as indicated in respective blocks 210 and 211.

Then a check is made (block 220) whether the LTU output voltage and each of the transistor output voltages are within limits. Next, block 230 checks whether the LTU output current is within limits. Finally, a check as per block 240 is performed to determine whether the output voltages for all off-transistors are actually at zero, or within a prescribed range equivalent to zero.

Should any of the aforementioned conditions not be met, further checks and certain responses are performed as set forth below. For example, if the output LTU voltage or any of the transistor output voltages are above limits, an LTU fault is recognized by the controller 99 and an associated fault code is stored in memory, as indicated at respective blocks 320 and 420.

If the LTU output current is above limits, all transistors 44 are disabled, and an output device fault, such as a fault at the flight control computer 13, is signalled, as suggested by blocks 330 and 430.

If the output voltage for any of the off-transistors is not zero, then the particular one or ones of transistors 44 are turned off and the associated channel number is removed from the priority list, as indicated at block 340. Additionally, as block 440 suggests, an associated LTU fault indication is signalled.

Next, a check is conducted to determine whether the on-transistor and channel actually correspond to the power source of highest priority (see block 250). If not, the transistor 44 corresponding to the highest priority source is turned on. As block 350 shows, the presently on source and transistor are turned off.

In the event that the output LTU current is below limits, or the output voltages are above limits without a corresponding overcurrent at the output, transistor "n" is turned on and the previous ramped-up transistor "n−1" is disabled, as suggested at block 500.

The information disclosed above may lead individuals skilled in the art to conceive of related embodiments which nonetheless fall within the scope of the invention addressed herein. Accordingly, attention is directed to the claims which follow, since these specify the precise bounds of the invention.

We claim:

1. A power distribution system, comprising:

at least two switch means for controlling the application of power from a plurality of power sources[,] to a power output[; at least two current means for preventing reverse power flow through respective ones of said plurality of switch means]; and processing means for providing control signals to operate said switch means, effective to switch respective ones of said power sources between on and off states with respect to said power output;

characterized by:

first voltage [detection] *deriving* means for [detecting] *deriving first voltage signals dependent on* the levels of first voltages at a first side of corresponding ones of said switch means;

first comparator means for comparing the [voltages detected] *first voltage signals derived* by said first voltage [detection] *deriving* means to selected upper and lower voltage thresholds and for providing a signal indication of an abnormal voltage condition to said processing means when any of said first [detected voltages are] *voltage signals is* at a level not within the bounds of said upper and lower voltage thresholds, said processing means responding to said abnormal signal [indicator] *indication* such that *the* power sources are selectively switched *off* with respect to said power output in view of any abnormal voltage conditions.

2. The system of claim 1, further characterized by:

second voltage [detection] *deriving* means for [detecting] *deriving second voltage signals dependent on* the levels of voltages at another side of corresponding ones of said [plurality of] switch means; and second comparator means for comparing the [voltages detected] *second voltage signals derived* by said second voltage [detection] *deriving* means to at least a lower voltage threshold, and for providing indications of abnormal voltage conditions to said processing means[,] when any of said second [detected voltages] *voltage signals* is at a level not above said lower voltage threshold.

*3. The system of claim 2, characterized in that said deriving means derives said second voltage signals from a region situated between the respective switch means and said power output.*

*4. The system of claim 3, characterized by at least two reverse current flow preventing means each for preventing reverse power flow through a different one of said switch means, each of said reverse current flow preventing means being interposed between a different one of said regions and said power output.*

*5. The system of claim 4, further characterized by means for detecting the voltage in said power outlet downstream of each of said reverse current flow preventing means and for generating an additional signal indicative of the thus detected voltage, and by means for supplying said additional signal to said processing means.*

*6. The system of claim 5, further characterized by means for detecting the current flowing through said power outlet downstream of each of said reverse current flow preventing means and for generating an auxiliary signal indicative of the thus detected current, and by means for supplying said additional signal to said processing means.*

*7. The system of claim 4, further characterized by means for detecting the current flowing through said power outlet downstream of each of said reverse current flow preventing means and for generating an auxiliary signal indicative of the thus detected current, and by means for supplying said additional signal to said processing means.*

*8. The system of claim 1, and further characterized by at least two reverse current flow preventing means each for preventing reverse power flow through a different one of said switch means.*

*9. The system of claim 8, characterized in that each of said reverse current flow preventing means is interposed between a different one of said switch means and said power output.*

*10. The system of claim 8, further characterized by means for detecting the voltage in said power outlet downstream of each of said reverse current flow preventing means and for generating an additional signal indicative of the thus detected voltage, and by means for supplying said additional signal to said processing means.*

*11. The system of claim 10, further characterized by means for detecting the current flowing through said power outlet downstream of each of said reverse current flow preventing means and for generating an auxiliary signal indicative of the thus detected current, and by means for supplying said additional signal to said processing means.*

*12. The system of claim 8, further characterized by means for detecting the current flowing through said power outlet downstream of each of said reverse current flow preventing means and for generating an auxiliary signal indicative of the thus detected current, and by means for supplying said additional signal to said processing means.*

*13. The system of claim 1, further characterized by means for detecting the voltage in said power outlet and for generating an additional signal indicative of the thus detected voltage, and by means for supplying said additional signal to said processing means.*

*14. The system of claim 13, further characterized by means for detecting the current flowing through said power outlet and for generating an auxiliary signal indicative of the thus detected current, and by means for supplying said additional signal to said processing means.*

*15. The system of claim 1, further characterized by means for detecting the current flowing through said power outlet and for generating an auxiliary signal indicative of the thus detected current, and by means for supplying said additional signal to said processing means.*

*16. The system of claim 1, further characterized in that said processing means includes means for operating said switches in accordance with a predetermined protocol.*

*17. The system of claim 1, characterized in that said switch means, said processing means, said deriving means and said first comparator means together constitute a load transfer unit, and further characterized by at least one additional load transfer unit similar to said load transfer unit and connected to a different power output, each of said load transfer units being connected to less than all of said power sources.*

*18. The system of claim 17, characterized in that each of said load transfer units is connected to all but one of said power sources, said one power source being different for each of said transfer units.*

*19. A power distribution system interposed between a plurality of power sources and a number of power outputs, comprising:*

*one load transfer unit for each of said power outputs, each of said load transfer units including a multitude of inputs, a single output, and means for establishing connection between only a selected one of said inputs and said single output at any given time;*

*first connecting means for connecting said single output of each of said load transfer units at all times exclusively to one of said power outputs, said one power output being different for each of said load transfer units; and*

*second connecting means for individually connecting said inputs of each of said load transfer units to less than all of said power sources.*

*20. The system of claim 19, wherein said second connecting means connects said inputs of each of said load transfer units to all but one of said power sources, said one power source being different for each of said load transfer units.*

* * * * *